(12) United States Patent
Ishiguro et al.

(10) Patent No.: US 10,088,605 B2
(45) Date of Patent: Oct. 2, 2018

(54) OPTICAL FILM AND PRODUCTION METHOD FOR SAME

(71) Applicant: ZEON CORPORATION, Tokyo (JP)

(72) Inventors: Atsushi Ishiguro, Tokyo (JP); Daisuke Saito, Tokyo (JP); Teiji Kohara, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/898,219

(22) PCT Filed: Jun. 24, 2014

(86) PCT No.: PCT/JP2014/066661
§ 371 (c)(1),
(2) Date: Dec. 14, 2015

(87) PCT Pub. No.: WO2015/002020
PCT Pub. Date: Jan. 8, 2015

(65) Prior Publication Data
US 2016/0146977 A1 May 26, 2016

(30) Foreign Application Priority Data
Jul. 1, 2013 (JP) .................. 2013-138048

(51) Int. Cl.
*G02B 5/30* (2006.01)
*G02B 1/14* (2015.01)
(Continued)

(52) U.S. Cl.
CPC ............ *G02B 1/14* (2015.01); *B29C 47/0021* (2013.01); *B29C 47/085* (2013.01);
(Continued)

(58) Field of Classification Search
CPC ...... G02B 5/3033; G02B 5/30; G02B 5/3025; G02B 1/04; G02B 5/3083; G02B 1/14;
(Continued)

(56) References Cited

U.S. PATENT DOCUMENTS

| 2010/0290117 A1 | 11/2010 | Diehl et al. |
| 2011/0038045 A1 | 2/2011 | Zhou et al. |

(Continued)

FOREIGN PATENT DOCUMENTS

| JP | 2000-219752 A | 8/2000 |
| JP | 2000-280315 A | 10/2000 |

(Continued)

OTHER PUBLICATIONS

Oct. 14, 2014 International Search Report issued in International Patent Application No. PCT/JP2014/066661.

(Continued)

*Primary Examiner* — Jade R Chwasz
(74) *Attorney, Agent, or Firm* — Oliff PLC (57) ABSTRACT

An optical film includes a hydrogenated block copolymer-[2] obtained by hydrogenating 90% or more of unsaturated bonds of block copolymer-[1] that includes at least two polymer blocks-[A] and at least one polymer block-[B], the polymer block-[A] including a repeating unit derived from an aromatic vinyl compound as main component, the polymer block-[B] including repeating unit derived from a linear conjugated diene compound as main component, ratio (wA: wB) of weight fraction wA of the polymer block-[A] in block copolymer-[1] to weight fraction wB of polymer block-[B] in block copolymer-[1] being 40:60 to 80:20, height from peak of ridge of a die line is formed in longitudinal direction of the optical film to a valley bottom point that is contiguous to the ridge being 100 nm or less (Continued)

over the optical film entire surface, and slope of the die line being 300 nm/mm or less over the optical film entire surface.

4 Claims, 1 Drawing Sheet

(51) Int. Cl.
*B29C 47/00* (2006.01)
*B29C 47/08* (2006.01)
*G02B 1/04* (2006.01)
*B29C 47/12* (2006.01)
*B29C 47/88* (2006.01)
*B29L 11/00* (2006.01)

(52) U.S. Cl.
CPC ........ *B29C 47/885* (2013.01); *B29C 47/8865* (2013.01); *B29C 47/8875* (2013.01); *G02B 1/04* (2013.01); *G02B 5/3033* (2013.01); *G02B 5/3083* (2013.01); *B29C 47/12* (2013.01); *B29C 47/887* (2013.01); *B29C 47/8845* (2013.01); *B29L 2011/0066* (2013.01)

(58) Field of Classification Search
CPC ....... G02B 1/08; B29C 55/026; B29C 55/023; B29C 47/0021; B29C 47/8845; B29C 47/885; B29C 47/887; B29C 47/085; B29C 47/8875; B29C 47/12; B29C 47/8865; B29L 2011/0066

USPC .................................................... 359/483.01
See application file for complete search history.

(56) References Cited

U.S. PATENT DOCUMENTS

| | | | |
|---|---|---|---|
| 2012/0015169 A1* | 1/2012 | Ohta | ................ B29D 11/00865 428/216 |
| 2013/0008506 A1 | 1/2013 | Tanahashi et al. | |
| 2013/0244367 A1 | 9/2013 | Kohara et al. | |

FOREIGN PATENT DOCUMENTS

| | | |
|---|---|---|
| JP | 2003-114329 A | 4/2003 |
| JP | 2005-128360 A | 5/2005 |
| JP | 2006-283010 A | 10/2006 |
| JP | 2008-015118 A | 1/2008 |
| JP | 2008-225226 A | 9/2008 |
| JP | 2009-237421 A | 10/2009 |
| JP | 2010-008463 A | 1/2010 |
| WO | 2011/096389 A1 | 8/2011 |
| WO | 2012/043708 A1 | 4/2012 |

OTHER PUBLICATIONS

Oct. 14, 2014 Written Opinion issued in International Patent Application No. PCT/JP2014/066661.

* cited by examiner

OPTICAL FILM AND PRODUCTION METHOD FOR SAME

TECHNICAL FIELD

The present invention relates to an optical film that is formed of a hydrogenated block copolymer and is useful as a polarizer protective film and the like. More specifically, the invention relates to an optical film that has a reduced number of surface defects and has an excellent surface state.

BACKGROUND ART

It is known that a hydrogenated aromatic vinyl compound polymer that is obtained by hydrogenating the aromatic ring of an aromatic vinyl compound polymer, a hydrogenated block copolymer that is obtained by hydrogenating the double bonds (that are derived from an aromatic ring and a diene) of a block copolymer that includes a polymer block that includes a repeating unit derived from an aromatic vinyl compound as the main component, and a polymer block that includes a repeating unit derived from a linear conjugated diene compound as the main component, can be used as an optical film (e.g., polarizing film and retardation film), and it is possible to provide the desired retardation to a film formed by extrusion by stretching the film (see Patent Documents 3 to 6).

A film that is formed of a thermoplastic resin and used for a device (e.g., liquid crystal display device) that utilizes polarized light is required to have optical transparency, show only a small change in the in-plane retardation in the planar direction and the thickness direction, and rarely cause a phenomenon in which an image is distorted due to the lens effect of the convexities and concavities of the surface of the film, for example.

Therefore, a highly uniform thickness is required for an optical film, and an optical film has been produced using a solution casting method in order to obtain a film having a uniform thickness.

Since the solution casting method has problems in that the solvent used therefor causes environmental pollution, and it is difficult to achieve high productivity, a melt extrusion method has been used in recent years. However, the melt extrusion method also has problems in that the thickness of the resulting film easily varies, and a die line easily occurs in the film extrusion direction.

Examples of the die line include a die line (linear trace) that is formed when a molten resin that is extruded from the die adheres to the wall surface of the die, a die line that is formed due to a resin that adheres to the opening of the lip of the die, and the like. These die lines consist of ridges and valleys that have a height of about 0.1 to 0.5 μm and a width of about 50 to 500 μm.

When an optical film has such a die line, an optical signal error may occur, or the pattern of the die line may be displayed on the display, for example. Therefore, attempts to suppress a die line have been made by adjusting the temperature of the molten resin, appropriately selecting the melt viscosity, providing an air gap between the cooling roll and the die, or applying a voltage to the molten resin film that comes in contact with the cooling roll when extruding a film, for example. The lip of the die may be subjected to a polishing treatment or a plating treatment (e.g., chromium plating).

However, these methods cannot sufficiently prevent the occurrence of a die line, and a die line may occur during production, whereby various problems may occur in terms of the production, the stability of the product properties, and the like.

Various measures have been proposed in order to solve the above problems.

For example, Patent Document 1 discloses a transparent resin sheet that is formed of a cycloolefin-based thermoplastic resin, at least one side of the transparent resin sheet forms a flat and smooth surface having a surface roughness of 0.01 μm or less, and the transparent resin sheet having a thickness of 0.05 to 3 mm and a residual retardation of 20 nm or less. Patent Document 1 also discloses a method that produces the transparent resin sheet by causing the cycloolefin-based thermoplastic resin (in a molten state) that has been extruded from a T-die that is provided to an extruder to adhere to a metal cooling roll or a metal cooling belt under pressure by compressing the cycloolefin-based thermoplastic resin between the cooling roll and the cooling belt, and removing the cycloolefin-based thermoplastic resin from the cooling roll or the cooling belt at a temperature equal to or lower than the glass transition temperature of the cycloolefin-based thermoplastic resin.

Patent Document 2 discloses a method for producing a cycloolefin resin extruded product (sheet or film) that includes melting a cycloolefin resin, extruding the melted cycloolefin resin through a die that has a lip having a peel strength of 75 N or less to form the cycloolefin resin. Patent Document 2 states that the resulting cycloolefin resin extruded product has excellent surface flatness and smoothness, and can suitably be used for optical applications.

Patent Document 3 discloses a method for producing an optical film that includes melting an amorphous thermoplastic resin having an alicyclic structure using an extruder, extruding the melted amorphous thermoplastic resin in the shape of a sheet from a die, forming the extruded sheet-shaped amorphous thermoplastic resin by bringing the extruded sheet-shaped amorphous thermoplastic resin into contact with at least one cooling drum, and taking up the formed hydrogenated block copolymer [2], the die being designed so that the average value of the surface roughness Ra of the die lip is 0.05 μm or less, and the distribution range of the surface roughness Ra over the width of the die lip is ±0.025 μm or less with respect to the average value to obtain an optical film characterized in that the height from the peak of a ridge of a die line to the bottom point of a valley that is contiguous to the ridge is 100 nm or less over the entire surface of the optical film, and the slope of the die line is 300 nm/mm or less over the entire surface of the optical film.

Patent Documents 4 and 6 disclose that an optical compensation film and an optical film having small retardation can be obtained by utilizing a hydrogenated block copolymer in which both a polymer block derived from an aromatic vinyl compound and a polymer block derived from a conjugated diene compound are hydrogenated. Such a hydrogenated block copolymer can be supplied on a large scale as compared with a thermoplastic resin that is synthesized from a cycloolefin and has an alicyclic structure since the aromatic vinyl compound and the conjugated diene used as the raw materials are readily available, and it has been desired to put an optical film that utilizes such a hydrogenated block copolymer into practical use.

RELATED-ART DOCUMENT

Patent Document

Patent Document 1: JP-A-2000-219752
Patent Document 2: JP-A-2000-280315

Patent Document 3: JP-A-2005-128360
Patent Document 4: JP-A-2003-114329
Patent Document 5: WO2009/067290 (US2010/290117A1)
Patent Document 6: WO2009/137278 (US2011/038045A1)

SUMMARY OF THE INVENTION

Technical Problem

In recent years, the resolution and the brightness of a liquid crystal display device have been increased, and a significant bright or dark striation may be observed on the display screen due to a die line, or leakage of light may occur when an optical film obtained using the method disclosed in any of the above patent documents is used for a display device that includes a light source that emits light having high brightness. Therefore, a further improvement has been desired.

In view of the above situation, the applicant of the present application found that adhesion of an oxidized product to the opening of the lip of the die during melt extrusion can be reduced using a hydrogenated block copolymer in which both a polymer block derived from an aromatic vinyl compound and a polymer block derived from a conjugated diene compound are hydrogenated (see Patent Documents 4 and 6, for example) as compared with a thermoplastic resin having an alicyclic structure that is synthesized from a cycloolefin (see Patent Documents 2 and 3, for example).

In this case, however, the occurrence of a die line was not necessarily suppressed.

An object of the invention is to provide an optical film that is produced using a hydrogenated block copolymer that can be easily supplied on an industrial scale, has reduced surface defects, and does not produce a bright or dark striation due to a die line while preventing leakage of light when used for a high-resolution display device that includes a light source that emits light having high brightness.

Solution to Problem

The inventors of the invention conducted extensive studies in order to achieve the above object. As a result, the inventors found that the above object can be achieved by forming a film of a specific hydrogenated block copolymer by melt extrusion using a specific die and pellets of the hydrogenated block copolymer that have been heated (before melt extrusion) within a specific temperature range for a time equal to or longer than a specific time. This finding has led to the completion of the invention.

Several aspects of the invention provide the following optical film (see (1)), polarizer protective film (see (2)), retardation film (see (3)), and method for producing an optical film (see (4)).
(1) An optical film including a hydrogenated block copolymer [2] that is obtained by hydrogenating 90% or more of the unsaturated bonds of a block copolymer [1] that includes at least two polymer blocks [A] and at least one polymer block [B], the polymer block [A] including a repeating unit derived from an aromatic vinyl compound as the main component, the polymer block [B] including a repeating unit derived from a linear conjugated diene compound as the main component, the ratio (wA:wB) of the weight fraction wA of the polymer block [A] in the block copolymer [1] to the weight fraction wB of the polymer block [B] in the block copolymer [1] being 40:60 to 80:20, the height from the peak of a ridge of a die line that is formed in the longitudinal direction of the optical film to the bottom point of a valley that is contiguous to the ridge being 100 nm or less over the entire surface of the optical film, and the slope of the die line that is calculated by the following expression (1) being 300 nm/mm or less over the entire surface of the optical film.

Slope (nm/mm)=(height from peak of ridge to bottom point of valley that is contiguous to ridge)/ (width from peak of ridge to bottom point of valley that is contiguous to ridge) (1)

(2) A polarizer protective film including the optical film according to (1).
(3) A retardation film obtained by stretching the optical film according to (1).
(4) A method for producing an optical film including melting a hydrogenated block copolymer [2] using an extruder, extruding the melted hydrogenated block copolymer [2] in the shape of a sheet from a die provided to the extruder, forming the extruded sheet-shaped hydrogenated block copolymer [2] by bringing the extruded sheet-shaped hydrogenated block copolymer [2] into contact with at least one cooling drum, and taking up the formed hydrogenated block copolymer [2], the die being designed so that the average value of the surface roughness Ra of the die lip is 0.05 μm or less, and the distribution range of the surface roughness Ra over the width of the die lip is ±0.025 or less with respect to the average value, and pellets of the hydrogenated block copolymer [2] that have been held at 50 to 120° C. for 2 hours or more being used.

Advantageous Effects of the Invention

The aspects of the invention thus provide an optical film that has reduced surface defects, does not produce a bright or dark striation due to a die line while preventing brightness non-uniformity when used for a display device that includes a light source that emits light having high brightness.

DESCRIPTION OF EMBODIMENTS

An optical film according to one embodiment of the invention includes a hydrogenated block copolymer [2] that is obtained by hydrogenating 90% or more of the unsaturated bonds of a block copolymer [1] that includes at least two polymer blocks [A] and at least one polymer block [B], the polymer block [A] including a repeating unit derived from an aromatic vinyl compound as the main component, the polymer block [B] including a repeating unit derived from a linear conjugated diene compound as the main component, and the ratio (wA:wB) of the weight fraction wA of the polymer block [A] in the block copolymer [1] to the weight fraction wB of the polymer block [B] in the block copolymer [1] being 40:60 to 80:20.

1. Block Copolymer [1]

The block copolymer [1] that is a precursor of the hydrogenated block copolymer [2] that is included in the optical film according to one embodiment of the invention includes at least two polymer blocks [A] and at least one polymer block [B].

The polymer block [A] includes a structural unit (repeating unit) derived from an aromatic vinyl compound as the main component. The content of the structural unit derived from the aromatic vinyl compound in the polymer block [A] is normally 90 wt % or more, preferably 95 wt % or more, and more preferably 99 wt % or more.

The polymer block [A] may include a structural unit derived from a linear conjugated diene compound and/or a structural unit derived from a vinyl compound other than the aromatic vinyl compound (hereinafter may be referred to as "additional vinyl compound") in addition to the structural unit derived from the aromatic vinyl compound. The content of the structural unit derived from the linear conjugated diene compound and/or the structural unit derived from the additional vinyl compound in the polymer block [A] is normally 10 wt % or less, preferably 5 wt % or less, and more preferably 1 wt % or less. If the content of the structural unit derived from the aromatic vinyl compound in the polymer block [A] is too low, the optical film according to one embodiment of the invention may exhibit low heat resistance.

A plurality of polymer blocks [A] may be either identical or different as long as the above range is satisfied.

The polymer block [B] includes a structural unit (repeating unit) derived from a linear conjugated diene compound as the main component. The content of the structural unit derived from the linear conjugated diene compound in the polymer block [B] is normally 90 wt % or more, preferably 95 wt % or more, and more preferably 99 wt % or more. When the content of the repeating unit derived from the linear conjugated diene compound is within the above range, the optical film according to one embodiment of the invention exhibits excellent birefringence when stretched, and exhibits excellent flexibility.

The polymer block [B] may include a repeating unit derived from an aromatic vinyl compound and/or a repeating unit derived from the additional vinyl compound in addition to the repeating unit derived from the linear conjugated diene compound. The content of the repeating unit derived from the aromatic vinyl compound and/or the repeating unit derived from the additional vinyl compound in the polymer block [B] is normally 10 wt % or less, preferably 5 wt % or less, and more preferably 1 wt % or less. If the content of the structural unit derived from the aromatic vinyl compound in the polymer block [B] is high, the optical film may exhibit insufficient birefringence.

When the block copolymer [1] includes a plurality of polymer blocks [B], the plurality of polymer blocks [B] may be either identical or different as long as the above range is satisfied.

Examples of the aromatic vinyl compound include styrene; an alkyl-substituted styrene such as α-methylstyrene, 2-methylstyrene, 3-methylstyrene, 4-methylstyrene, 2,4-diisopropylstyrene, 2,4-dimethylstyrene, 4-t-butylstyrene, and 5-t-butyl-2-methylstyrene; a halogen-substituted styrene such as 4-chlorostyrene, 2,4-dichlorostyrene, and 4-fluorostyrene; an aryl-substituted styrene such as 4-phenylstyrene; and an alkoxy-substituted styrene such as 4-methoxystyrene and 3,5-dimethoxystyrene. Among these, an aromatic vinyl compound that does not include a polar group (e.g., styrene and alkyl-substituted styrene) is preferable from the viewpoint of hygroscopicity, and styrene is particularly preferable from the viewpoint of industrial availability.

Specific examples of the linear conjugated diene compound include 1,3-butadiene, isoprene, 2,3-dimethyl-1,3-butadiene, 1,3-pentadiene, and the like. Among these, a linear conjugated diene compound that does not include a polar group is preferable from the viewpoint of hygroscopicity, and 1,3-butadiene and isoprene are particularly preferable from the viewpoint of industrial availability.

Examples of the additional vinyl compound include a linear vinyl compound and a cyclic vinyl compound. The additional vinyl compound may be a vinyl compound that is substituted with a nitrile group, an alkoxycarbonyl group, a hydroxycarbonyl group, or a halogen atom, and/or an unsaturated cyclic acid anhydride or an unsaturated imide compound. A vinyl compound that does not include a polar group (e.g., a linear olefin such as ethylene, propylene, 1-butene, 1-pentene, 1-hexene, 1-heptene, 1-octene, 1-nonene, 1-decene, 1-dodecene, 1-eicosene, 4-methyl-1-pentene, and 4,6-dimethyl-1-heptene, and a cyclic olefin such as vinylcyclohexane) is preferable as the additional vinyl compound from the viewpoint of hygroscopicity. A linear olefin is more preferable, and ethylene and propylene are particularly preferable.

The number of polymer blocks [A] included in the block copolymer [1] is normally 5 or less, preferably 4 or less, and more preferably 3 or less. When the block copolymer [1] includes a plurality of polymer blocks [A] and/or a plurality of polymer blocks [B], the ratio (Mw(A1)/Mw(A2)) of the weight average molecular weight Mw(A1) of the polymer block among the plurality of polymer blocks [A] that has the highest weight average molecular weight to the weight average molecular weight Mw(A2) of the polymer block among the plurality of polymer blocks [A] that has the lowest weight average molecular weight, and the ratio (Mw(B1)/Mw(B2)) of the weight average molecular weight Mw(B1) of the polymer block among the plurality of polymer blocks [B] that has the highest weight average molecular weight to the weight average molecular weight Mw(B2) of the polymer block among the plurality of polymer blocks [B] that has the lowest weight average molecular weight, are 2.0 or less, preferably 1.5 or less, and more preferably 1.2 or less.

The block copolymer [1] may be a linear block copolymer, or may be a radial block copolymer. It is preferable that the block copolymer be a linear block copolymer since excellent mechanical strength can be obtained. It is most preferable that the block copolymer [1] be a [A]-[B]-[A] triblock copolymer in which the polymer block [A] is bonded to each end of the polymer block [B], or a [A]-[B]-[A]-[B]-[A] pentablock copolymer in which the polymer block [B] is bonded to each end of the polymer block [A], and the polymer block [A] is bonded to the other end of each polymer block [B].

The ratio (wA:wB) of the weight fraction wA of the polymer block [A] in the block copolymer [1] to the weight fraction wB of the polymer block [B] in the block copolymer [1] is 40:60 to 80:20, preferably 50:50 to 75:25, and more preferably 60:40 to 70:30. If the weight fraction wA is too high, the heat resistance of the modified hydrogenated block copolymer [3] used in connection with one embodiment of the invention increases, but a decrease in flexibility may occur, and the resulting optical film may break at the cutting surface. If the weight fraction wA is too low, a decrease in heat resistance may occur, and the resulting film may shrink immediately after being stretched, and may not maintain retardation.

The polystyrene-equivalent weight average molecular weight (Mw) of the block copolymer [1] determined by gel permeation chromatography (GPC) (eluent: tetrahydrofuran (THF)) is normally 30,000 to 200,000, preferably 40,000 to 150,000, and more preferably 50,000 to 100,000. The molecular weight distribution (Mw/Mn) of the block copolymer [1] is preferably 3 or less, more preferably 2 or less, and particularly preferably 1.5 or less.

The block copolymer [1] may be produced using a known production method (e.g., living anionic polymerization). More specifically, the block copolymer [1] may be produced using a method that alternately polymerizes a monomer mixture (a) that includes the aromatic vinyl compound as the main component, and a monomer mixture (b) that includes the linear conjugated diene compound as the main component; a method that sequentially polymerizes the monomer mixture (a) that includes the aromatic vinyl compound as the main component, and the monomer mixture (b) that includes the linear conjugated diene compound as the main component, and couples the terminals of the polymer block [B] using a coupling agent; or the like.

2. Hydrogenated Block Copolymer [2]

The hydrogenated block copolymer [2] used in connection with one embodiment of the invention is obtained by hydrogenating the carbon-carbon unsaturated bonds of the main chain, the side chain, and the aromatic ring of the block copolymer [1]. The hydrogenation rate of the hydrogenated block copolymer [2] is normally 90% or more, preferably 97% or more, and more preferably 99% or more. The resulting formed article exhibits better weatherability and heat resistance as the hydrogenation rate increases. The hydrogenation rate of the hydrogenated block copolymer [2] may be determined by $^1$H-NMR analysis.

The unsaturated bond hydrogenation method, the hydrogenation reaction configuration, and the like are not particularly limited. The unsaturated bonds may be hydrogenated using a known method. It is preferable to use a hydrogenation method that can increase the hydrogenation rate and rarely causes a polymer chain cleavage reaction. Examples of such a hydrogenation method include the methods disclosed in WO2011/096389, WO2012/043708, and the like.

The hydrogenation catalyst and/or the polymerization catalyst are/is removed from the reaction solution including the hydrogenated block copolymer [2], and the hydrogenated block copolymer [2] is collected from the reaction solution. The hydrogenated block copolymer [2] thus collected may normally be pelletized, and subjected to the subsequent film-forming process, for example.

The polystyrene-equivalent weight average molecular weight (Mw) of the hydrogenated block copolymer [2] determined by GPC using tetrahydrofuran (THF) as a solvent is normally 35,000 to 200,000, preferably 40,000 to 150,000, and more preferably 45,000 to 100,000. The molecular weight distribution (Mw/Mn) of the hydrogenated block copolymer [2] is preferably 3 or less, more preferably 2 or less, and particularly preferably 1.5 or less. When the weight average molecular weight (Mw) and the molecular weight distribution (Mw/Mn) of the hydrogenated block copolymer [2] are within the above ranges, the mechanical strength and the heat resistance of the resulting film are improved.

The hydrogenated block copolymer [2] used in connection with one embodiment of the invention may include an additional component. The additional component is not particularly limited. Examples of the additional component include a layered crystal compound; inorganic fine particles; a stabilizer such as an antioxidant, a thermal stabilizer, a light stabilizer, a weather stabilizer, a UV absorber, and a near-infrared absorber; a resin modifier such as a lubricant and a plasticizer; a coloring agent such as a dye and a pigment; an antistatic agent; and the like. These additional components may respectively be used either alone or in combination. The additional component may be used in an appropriate amount as long as the object of the invention is not impaired.

It is effective to add an antioxidant to the hydrogenated block copolymer [2] in order to suppress adhesion of an oxidized resin to the lip of the die when subjecting the hydrogenated block copolymer [2] to melt extrusion to form a film. Examples of the antioxidant include a phenol-based antioxidant, a phosphorus-based antioxidant, a sulfur-based antioxidant, and the like. Among these, a phenol-based antioxidant (particularly an alkyl-substituted phenol-based antioxidant) is preferable. The antioxidant may be used in an appropriate amount as long as the object of the invention is not impaired. The antioxidant is normally used in a ratio of 0.005 to 1 part by weight, and preferably 0.01 to 0.5 parts by weight, based on 100 parts by weight of the hydrogenated block copolymer [2].

3. Optical Film

An optical film according to one embodiment of the invention is characterized in that the height from the peak of a ridge of a die line that is formed in the longitudinal direction of the optical film to the bottom point of a valley that is contiguous to the ridge is 100 nm or less over the entire surface of the optical film, and the slope of the die line that is calculated by the following expression (1) is 300 nm/mm or less over the entire surface of the optical film.

Slope (nm/mm)=(height from peak of ridge to bottom point of valley that is contiguous to ridge)/ (width from peak of ridge to bottom point of valley that is contiguous to ridge)     (1)

Note that the term "longitudinal direction" used herein in connection with the optical film refers to the flow direction in which the optical film is extruded. The expression "the height from the peak of a ridge of a die line that is formed in the longitudinal direction of the optical film to the bottom point of a valley that is contiguous to the ridge is 100 nm or less over the entire surface of the optical film" means that the height of the die line is necessarily 100 nm or less. The expression "the slope of the die line is 300 nm/mm or less over the entire surface of the optical film" means that the slope of the die line is necessarily 300 nm/mm or less.

The height from the peak of a ridge of a die line that is formed in the longitudinal direction of the optical film according to one embodiment of the invention to the bottom point of a valley that is contiguous to the ridge is preferably 50 nm or less, and more preferably 30 nm or less. The slope of the die line is preferably 100 nm/mm or less, and more preferably 50 nm/mm or less over the entire surface of the optical film according to one embodiment of the invention. When the height from the peak of a ridge of the die line to the bottom point of a valley that is contiguous to the ridge, and the slope of the die line are within the above ranges, a bright spot does not occur, and an excellent display state can be achieved even when the optical film incorporated in a liquid crystal display unit that includes a backlight unit having high brightness.

The height from the peak of a ridge of the die line to the bottom point of a valley that is contiguous to the ridge, and the slope of the die line may be measured using a three-dimensional surface structural analysis microscope by scanning the surface of the film (having convexities and concavities) with light at a constant speed to generate an interference pattern.

Figure 1:
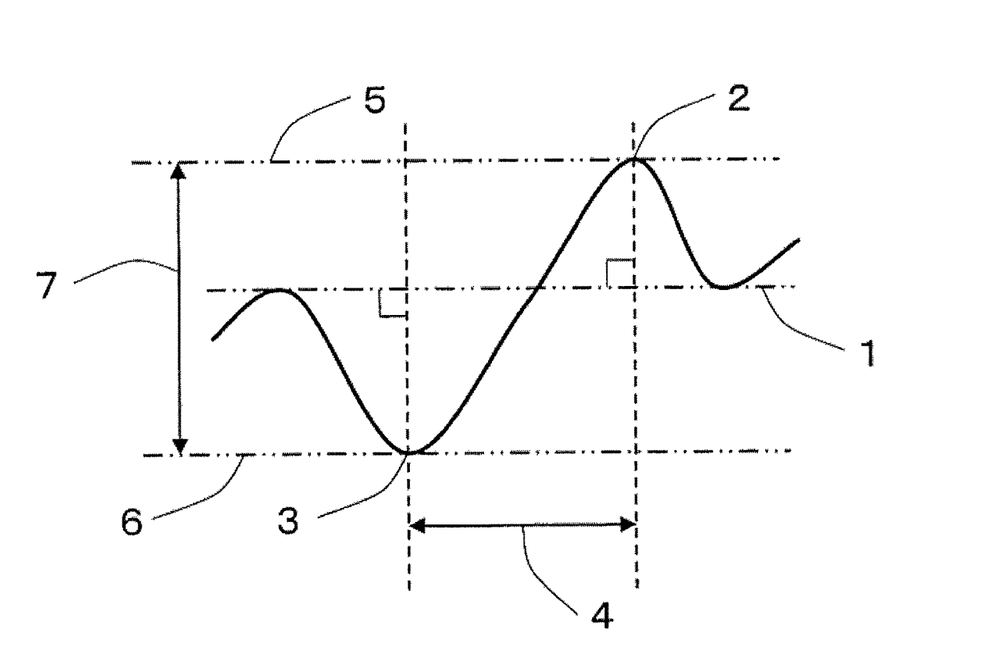
FIG. 1 is an enlarged view illustrating a die line of an optical film according to one embodiment of the invention.

As illustrated in FIG. 1, when the peak of a ridge and the bottom point of a valley that is contiguous to the ridge differ in base, a baseline 1 is drawn, and the distance between the intersection of the baseline 1 and a line that is drawn from the peak 2 of a ridge to the baseline 1 so as to perpendicularly intersect the baseline 1 and the intersection of the baseline 1 and a line that is perpendicularly drawn from the bottom point 3 of a valley to the baseline 1 so as to perpendicularly intersect the baseline 1 is determined to be the distance 4 from the peak of the ridge to the bottom point of the valley. A line 5 that passes through the peak 2 of the ridge and extends parallel to the baseline, and a line 6 that passes through the bottom point 3 of the valley and extends parallel to the baseline are drawn, and the minimum distance from the line 5 to the line 6 is determined to be the height 7 from the peak of the ridge to the bottom point of the valley that is contiguous to the ridge.

The width from the peak of a ridge of a die line that is formed in the longitudinal direction of the optical film according to one embodiment of the invention to the bottom point of a valley that is contiguous to the ridge is preferably 500 μm or more, and more preferably 1,000 μm or more.

The thickness of the optical film according to one embodiment of the invention is normally 20 to 300 μm, and preferably 30 to 200 μm. A variation in the thickness of the optical film is preferably 3% or less, and more preferably 2.5% or less with respect to the thickness. When a variation in the thickness of the optical film is within the above range, it is possible to suppress color non-uniformity when the optical film according to one embodiment of the invention is incorporated in a liquid crystal display device.

4. Method for Producing Optical Film

A method for producing an optical film according to one embodiment of the invention includes melting the hydrogenated block copolymer [2] using an extruder, extruding the melted hydrogenated block copolymer [2] in the shape of a sheet from a die provided to the extruder, forming the extruded sheet-shaped hydrogenated block copolymer [2] by bringing the extruded sheet-shaped hydrogenated block copolymer [2] into contact with at least one cooling drum, and taking up the formed hydrogenated block copolymer [2].

The method for producing an optical film according to one embodiment of the invention utilizes a die that is designed so that the average value of the surface roughness Ra of the die lip is 0.05 μm or less, and the distribution range of the surface roughness Ra over the width of the die lip is ±0.025 μm or less with respect to the average value.

The die that is used when implementing the method for producing an optical film according to one embodiment of the invention is preferably designed so that the average value of the surface roughness Ra of the die lip is 0.01 μm or less, and the distribution range of the surface roughness Ra over the width of the die lip is ±0.005 μm or less with respect to the average value. The surface roughness Ra and the distribution of the surface roughness Ra may be measured using a non-contact three-dimensional surface shape-roughness analyzer. If the average value of the surface roughness Ra of the die lip exceeds 0.05 μm, an unacceptable die line may occur due to the die.

When implementing the method for producing an optical film according to one embodiment of the invention, pellets of the hydrogenated block copolymer [2] are normally held at 50 to 120° C. (preferably 60 to 115° C., and more preferably 70 to 110° C.) for 2 hours or more (preferably 48 hours or more) before subjecting the hydrogenated block copolymer [2] to melt extrusion. The amount of dissolved air in the pellets of the hydrogenated block copolymer [2] is reduced, and the occurrence of a die line is suppressed by heating the pellets of the hydrogenated block copolymer [2] under the above conditions. If the heating temperature and the heating time are less than the above ranges, dissolved air may not be sufficiently removed, and the occurrence of a die line may not be sufficiently suppressed. If the heating temperature exceeds the above range, it may be difficult to extrude the pellets of the hydrogenated block copolymer [2] due to blocking. If the heating time exceeds the above range, deterioration in color tone may occur.

The amount of dissolved air removed by heating is normally 100 ppm or more, and preferably 150 ppm or more. The amount of dissolved air released by heating the pellets may be determined from the weight loss of the pellets due to heating. The amount of dissolved air released by heating the pellets may also be determined using a Toepler pump.

If the pellets are allowed to stand at room temperature after reducing the amount of dissolved air in the pellets by heating, the pellets absorb air even in an atmosphere that does not include water. Therefore, it is necessary to subject the pellets to the melt extrusion step while maintaining the pellets in a heated state, or subject the pellets to the melt extrusion step before the pellets absorb air after cooling. It is preferable to subject the pellets to the melt extrusion step within 1 hour (more preferably within 0.5 hours) after cooling.

The hydrogenated block copolymer [2] is normally melted in the extruder (that includes a T-die) at a temperature higher than the glass transition temperature of the hydrogenated block copolymer [2] by 70 to 160° C., and preferably 90 to 140° C. The glass transition temperature of the hydrogenated block copolymer [2] may be determined from the peak top value of the loss factor tan δ in the viscoelastic spectrum. If the hydrogenated block copolymer [2] is melted in the extruder at too low a temperature, the flowability of the resin may be insufficient. If the hydrogenated block copolymer [2] is melted in the extruder at too high a temperature, the molecular weight of the resin may decrease due to decomposition.

The sheet-shaped hydrogenated block copolymer [2] extruded through the opening of the die may be brought into contact with the cooling drum using an arbitrary method. For example, an air knife method, a vacuum box method, an electrostatic method, or the like may be used. The number of cooling drums is not particularly limited, but is normally two or more. The cooling drums may be disposed linearly, or may be disposed in the shape of the letter Z or L, for example. The sheet-shaped hydrogenated block copolymer [2] extruded through the opening of the die may be passed through the cooling drums using an arbitrary method.

The state of adhesion of the extruded sheet-shaped hydrogenated block copolymer [2] to the cooling drum changes depending on the temperature of the cooling drum. The adhesion state is improved by increasing the temperature of the cooling drum. However, the sheet-shaped hydrogenated block copolymer [2] may be wound around the cooling drum without being removed from the cooling drum if the temperature of the cooling drum is increased to a large extent. When the glass transition temperature of the hydrogenated block copolymer [2] is referred to as Tg (° C.), the temperature of the cooling drum is normally set to (Tg+10)° C. or less, preferably (Tg−80) to (Tg−5)° C., and more preferably (Tg−60) to (Tg−10)° C. When the temperature of the cooling drum is within the above range, it is possible to prevent slippage, breakage, and the like.

It is preferable to melt the hydrogenated block copolymer [2] in the extruder, and pass the molten hydrogenated block copolymer [2] through a gear pump or a filter before extruding the hydrogenated block copolymer [2] from the die provided to the extruder. A uniform amount of resin can be extruded, and a variation in thickness can be reduced by utilizing a gear pump. Foreign matter can be removed from the resin by utilizing a filter, and an optical film that has no defects and has an excellent external appearance can be obtained.

The optical film according to one embodiment of the invention may also be used as a member used for a display device (e.g., liquid crystal display device), such as a polarizer protective film, a retardation film, a brightness enhancement film, a transparent conductive film, a touch panel substrate, a liquid crystal substrate, a diffuser sheet, and a prism sheet. The optical film according to one embodiment of the invention is suitable as a polarizer protective film and a retardation film.

5. Polarizer Protective Film

The optical film according to one embodiment of the invention may be suitably used as a polarizer protective film. When using the optical film according to one embodiment of the invention as a polarizer protective film, the in-plane retardation Re of the optical film is preferably 10 nm or less, and more preferably 3 nm or less. When the in-plane retardation Re of the optical film is 10 nm or less, it is possible to suppress color non-uniformity when the optical film is incorporated in a liquid crystal display unit. There is a tendency that color non-uniformity significantly occurs in a large-screen liquid crystal display device. The optical film (polarizer protective film) according to one embodiment of the invention is also suitable for such a large-screen display device. The in-plane retardation Re is calculated by Re=(Nx−Ny)×d (where, Nx and Ny are the in-plane principal refractive indices, and d is the thickness of the film). The in-plane retardation Re may be measured using a commercially-available automatic birefringence meter.

When using the optical film according to one embodiment of the invention as a polarizer protective film, the optical film is stacked on one side or each side of a polarizer through an appropriate adhesive. The polarizer is obtained by doping a polyvinyl alcohol-based film with iodine or the like, and stretching the resulting film. A pressure-sensitive adhesive or an adhesive that includes an appropriate polymer (e.g., an acrylic-based polymer, a silicone-based polymer, a polyester, a polyurethane, a polyether, a synthetic rubber, or a modified hydrogenated block copolymer obtained by introducing an alkoxysilyl group into the hydrogenated block copolymer [2] used in connection with one embodiment of the invention) as a base polymer is used to form an adhesive layer.

6. Retardation Film

The optical film according to one embodiment of the invention may be suitably used as a retardation film. When using the optical film according to one embodiment of the invention as a retardation film, the optical film according to one embodiment of the invention is stretched to provide the desired retardation to the optical film. The optical film may be stretched using a uniaxial stretching method such as a method that uniaxially stretches the optical film in the machine direction by utilizing the difference in circumferential speed between rolls, or a method that uniaxially stretches the optical film in the transverse direction using a tenter-type stretching machine; a biaxial stretching method such as a simultaneous biaxial stretching method that stretches the optical film in the machine direction by increasing the interval between holding clips while stretching the optical film in the transverse direction by utilizing the spread angle of a guide rail, or a successive biaxial stretching method that stretches the optical film in the machine direction by utilizing the difference in circumferential speed between rolls, and stretches the optical film in the transverse direction using a tenter-type stretching machine while holding each end of the optical film using a clip; or the like.

When the glass transition temperature of the hydrogenated block copolymer [2] is referred to as Tg (° C.), the stretching temperature is preferably set to (Tg−40) to (Tg+30)° C., and more preferably (Tg−30) to (Tg+10)° C. The stretching ratio is normally set to 1.01 to 30, preferably 1.05 to 10, and more preferably 1.1 to 5.

Examples of the retardation film include a half-wave plate that provides a retardation of ½ wavelength with respect to a given wavelength, a quarter-wave plate that provides a retardation of ¼ wavelength with respect to a given wavelength, a wideband quarter-wave plate obtained by bonding a half-wave plate and a quarter-wave plate at a specific angle, a positive retarder (i.e., a retardation element that has positive retardation in the direction perpendicular to the surface of the element), a negative retarder (i.e., a retardation element that has negative retardation in the direction perpendicular to the surface of the element), and the like. The thickness of the retardation film is normally 30 to 200 μm.

A plurality of retardation films may be stacked so that the slow axes of the retardation films intersect each other at a given angle. The retardation films may be stacked using a known method. The retardation films may be stacked using a pressure-sensitive adhesive or the like.

EXAMPLES

The invention is further described below by way of examples. Note that the invention is not limited to the following examples. Note that the units "parts" and "%" respectively refer to "parts by weight" and "wt %" unless otherwise indicated.

The evaluation methods used in connection with the examples are described below.

(1) Weight Average Molecular Weight (Mw) and Molecular Weight Distribution (Mw/Mn)

The molecular weight (standard polystyrene-equivalent molecular weight) of the block copolymer and the hydrogenated block copolymer was measured by GPC at 38° C. using THF as an eluent. The molecular weight was measured using a GPC system "HLC8020GPC" (manufactured by Tosoh Corporation).

(2) Hydrogenation Rate

The hydrogenation rate of the main chain, the side chain, and the aromatic ring of the hydrogenated block copolymer [2] was calculated from the $^1$H-NMR spectrum.

(3) Glass Transition Temperature

The hydrogenated block copolymer was pressed to prepare a specimen having a length of 20 mm, a width of 4 mm, and a thickness of 1 mm. The viscoelastic spectrum of the specimen was measured in accordance with JIS K 7244-4 (temperature range: −100 to 150° C., vibration frequency: 10 Hz, heating rate 5° C./min) using a loss modulus measurement device ("DMS6100" manufactured by Seiko Instruments Inc.), and the glass transition temperature of the specimen was determined from the high temperature-side peak-top temperature of the loss factor tan δ.

(4) Surface Roughness Ra of Die Lip and Distribution of Surface Roughness Ra

The surface roughness Ra of the die lip was measured using a non-contact three-dimensional surface shape-roughness analyzer ("NewView 5000" manufactured by Zygo). The surface roughness Ra of the die lip was measured at an interval of 50 mm over the width of the die lip. The arithmetic mean value of the measured surface roughness Ra was used as a representative value, and the difference between each measured value and the arithmetic mean value was taken as the distribution of the surface roughness Ra.

(5) Film Thickness (Reference Thickness and Thickness Non-Uniformity)

The film was cut at intervals of 100 mm in the longitudinal direction. The thickness of each film (ten films) was measured at intervals of 0.48 mm in the widthwise direction using a contact web thickness gauge ("RC-101" manufactured by Maysun Co., Ltd.), and the arithmetic mean value of the measured values was taken as a reference thickness T (μm).

The thickness non-uniformity was calculated using the following expression (where, TMAX is the maximum thickness (μm), and TMIN is the minimum thickness (μm) (measured as described above)).

Thickness non-uniformity (%)=(TMAX−TMIN)/T× 100

(6) Height from Peak of Ridge of Die Line Formed in Film to Bottom Point of Valley that is Contiguous to Ridge, and Slope of Die Line Light was applied to the film, and the transmitted light was projected onto a screen. An area (die line) in which a bright or dark fringe was observed on the screen was observed over the entire width. The die line area of the film was cut to have a size of about 3×3 cm, and the surface of each side of the film was observed using a three-dimensional surface structural analysis microscope (manufactured by Zygo). The measurement was performed by generating an interference pattern on the film.

(7) Leakage of Light

Each of two unstretched films was stretched in the machine direction (stretching temperature: 132° C., stretching ratio: 2) to obtain stretched films, and the stretched films were bonded to each other so that the stretching axes were orthogonal to each other to prepare a laminate. The laminate was placed between polarizers so that the stretching axis of each stretched film formed an angle of 45° relative to the transmission axis of the polarizers. Light was passed through the laminate placed between the polarizers using a backlight, and the illuminance was measured using an illuminance meter ("51001" manufactured by Yokogawa Meters & Instruments Corporation) that is situated at a distance of 30 mm from the polarizer in the direction normal to the polarizer. It was determined that leakage of light occurred when the illuminance was 300 lx or more, and it was determined that leakage of light did not occur when the illuminance was less than 300 lx. Note that a backlight having an illuminance of 5,000 lx and a backlight having an illuminance of 10,000 lx were used.

Reference Example 1

Hydrogenated Block Copolymer [2]-1
Synthesis of Block Copolymer [1]-1

A reactor equipped with a stirrer in which the internal atmosphere had been sufficiently replaced with nitrogen, was charged with 550 parts of dehydrated cyclohexane, 30.0 parts of dehydrated styrene, and 0.475 parts of n-dibutyl ether. 0.61 parts of n-butyllithium (15% cyclohexane solution) was added to the mixture at 60° C. with stirring to initiate polymerization. The mixture was reacted at 60° C. for 60 minutes with stirring. The polymerization conversion rate was then determined by gas chromatography, and found to be 99.5%.

After the addition of 40.0 parts of dehydrated isoprene, the mixture was stirred at 60° C. for 30 minutes. The polymerization conversion rate was then measured, and found to be 99.5%.

After the addition of 30.0 parts of dehydrated styrene, the mixture was stirred at 60° C. for 60 minutes. The polymerization conversion rate was then measured, and found to be about 100%.

The reaction was then terminated by adding 0.5 parts of isopropyl alcohol. The resulting block copolymer [1]-1 had a weight average molecular weight (Mw) of 80,400 and a molecular weight distribution (Mw/Mn) of 1.03. The ratio (wA:wB) of the weight fraction wA to the weight fraction wB was 60:40.

Synthesis of Hydrogenated Block Copolymer [2]-1

The polymer solution obtained as described above was transferred to a pressure-resistant reactor equipped with a stirrer. After the addition of 3.0 parts of a nickel catalyst supported on a diatomaceous earth carrier ("T-8400RL" manufactured by Süd-Chemie) (hydrogenation catalyst) and 100 parts of dehydrated cyclohexane, the mixture was stirred (mixed). After replacing the atmosphere inside the reactor with hydrogen gas, hydrogen was supplied to the reactor while stirring the solution to effect a hydrogenation reaction at 190° C. for 6 hours under a pressure of 4.5 MPa. The resulting hydrogenated block copolymer [2]-1 had a weight average molecular weight (Mw) of 81,200 and a molecular weight distribution (Mw/Mn) of 1.04.

After removing the hydrogenation catalyst by filtering the reaction solution, 1.0 part of a solution prepared by dissolving 0.1 parts of pentaerythrityl-tetrakis[3-(3,5-di-t-butyl-4-hydroxyphenyl)propionate] ("Songnox 1010" manufactured by KOYO Chemical Research Center) (phenol-based antioxidant) in xylene was added to (dissolved in) the reaction solution.

After filtering the solution through a metal fiber filter (manufactured by Nichidai Corporation, pore size: 0.4 μm) to remove fine solids, the solvent (cyclohexane and xylene) and other volatile components were removed from the solution at 260° C. under a pressure of 0.001 MPa or less using a cylindrical evaporator ("Kontro" manufactured by Hitachi Ltd.). The molten polymer was filtered at 260° C. using a polymer filter (manufactured by Fuji Filter Mfg. Co., Ltd.) provided with a stainless steel sintered filter (pore size: 5 μm) connected to the evaporator, extruded in the shape of a strand from a die, cooled, and cut using a pelletizer to obtain 95 parts of pellets of the hydrogenated block copolymer [2]-1. The resulting pellets of the hydrogenated block copolymer [2]-1 had a weight average molecular weight (Mw) of 80,200 and a molecular weight distribution (Mw/Mn) of 1.04. The hydrogenation rate was about 100%, and the glass transition temperature (Tg) was 143° C.

Reference Example 2

Hydrogenated Block Copolymer [2]-2
Synthesis of Block Copolymer [1]-2

A polymerization reaction was effected and terminated in the same manner as in Reference Example 1, except that 20.0 parts of styrene, 20.0 parts of isoprene, 20.0 parts of styrene, 20.0 parts of isoprene, and 20.0 parts of styrene were added sequentially. The resulting block copolymer [1]-2 had a weight average molecular weight (Mw) of 79,100 and a molecular weight distribution (Mw/Mn) of 1.04. The ratio (wA:wB) of the weight fraction wA to the weight fraction wB was 60:40.

Synthesis of Hydrogenated Block Copolymer [2]-2

The polymer solution was subjected to a hydrogenation reaction in the same manner as in Reference Example 1. The resulting hydrogenated block copolymer [2]-2 had a weight average molecular weight (Mw) of 79,900 and a molecular weight distribution (Mw/Mn) of 1.06.

After completion of the hydrogenation reaction, an antioxidant was added in the same manner as in Reference Example 1, followed by concentration and drying to obtain 91 parts of pellets of the hydrogenated block copolymer [2]-2. The resulting pellets of the hydrogenated block copolymer [2]-2 had a weight average molecular weight (Mw) of 78,900 and a molecular weight distribution (Mw/Mn) of 1.06. The hydrogenation rate was about 100%, and the glass transition temperature (Tg) was 135° C.

Example 1

The pellets of the hydrogenated block copolymer [2]-1 obtained in Reference Example 1 were heated at 80° C. for 4 hours using a hot air dryer in which air was circulated. The pellets were melt-extruded at 260° C. within 1 hour after heating using a single-screw extruder (50 mm) provided with a leaf-disc polymer filter (filtration accuracy: 10 μm) and a T-die 1 having a die lip A (see Table 1). The extruded sheet-shaped hydrogenated block copolymer [2]-1 was passed (cooled) through three cooling drums (diameter: 250 mm, drum temperature: 105° C., take-up speed: 0.35 m/s) to obtain an optical film 1 having a width of 600 mm. Table 2 shows the evaluation results for the resulting optical film 1.
Amount of Dissolved Air in Pellets of Hydrogenated Block Copolymer [2]-1 that is Removed by Heating 5.0126 g of the pellets of the hydrogenated block copolymer [2]-1 used in Example 1 were weighed precisely, and put in a glass test tube provided with a ground cock and a ground joint. The test tube was connected to a Toepler pump through the ground joint, and air was removed from the test tube at 25° C. for 25 seconds. After closing the cock of the test tube, the test tube was heated at 80° C. for 4 hours using an oil bath to cause the dissolved air to be released from the pellets of the hydrogenated block copolymer [2]-1. The amount of air released into the test tube was measured at 25° C. under normal pressure using the Toepler pump while maintaining the test tube at 80° C. The amount of air thus measured was 0.787 mL. Note that the amount of residual air in the test tube when air was removed from the empty test tube under the same conditions was 0.01 mL or less (i.e., it is negligible). The amount of air released was calculated provided that the average molecular weight of air is 28.8, and found to be $10.12 \times 10^{-4}$ g (i.e., 202 ppm based on the weight of the pellets of the hydrogenated block copolymer [2]-1).

Example 2

An optical film 2 was obtained in the same manner as in Example 1, except that a T-die 2 having a die lip B (see Table 1) was used. Table 2 shows the evaluation results for the resulting optical film 2.

Example 3

An optical film 3 was obtained in the same manner as in Example 1, except that the pellets of the hydrogenated block copolymer [2]-2 obtained in Reference Example 2 were used and heated at 80° C. for 5 hours, and the T-die 2 having the die lip B (see Table 1) was used. Table 2 shows the evaluation results for the resulting optical film 3.

Example 4

An optical film 4 was obtained in the same manner as in Example 1, except that the pellets of the hydrogenated block copolymer [2]-2 obtained in Reference Example 2 were used and heated at 60° C. for 5 hours, and the T-die 2 having the die lip B (see Table 1) was used. Table 2 shows the evaluation results for the resulting optical film 4.

Comparative Example 1

An optical film 5 was obtained in the same manner as in Example 1, except that a T-die 3 having a die lip C (see Table 1) was used. Table 2 shows the evaluation results for the resulting optical film 5.

Comparative Example 2

An optical film 6 was obtained in the same manner as in Example 1, except that a T-die 4 having a die lip D (see Table 1) was used. Table 2 shows the evaluation results for the resulting optical film 6.

Comparative Example 3

An optical film 7 was obtained in the same manner as in Example 1, except that the pellets of the hydrogenated block copolymer [2]-1 were used without heating, and the T-die 2 having the die lip B (see Table 1) was used. Table 2 shows the evaluation results for the resulting optical film 7.

Comparative Example 4

An optical film 8 was obtained in the same manner as in Example 1, except that the pellets of the hydrogenated block copolymer [2]-1 were heated at 40° C. for 4 hours, and the T-die 2 having the die lip B (see Table 1) was used. Table 2 shows the evaluation results for the resulting optical film 8.

Comparative Example 5

An optical film 9 was obtained in the same manner as in Example 1, except that the pellets of the hydrogenated block copolymer [2]-1 were heated at 85° C. for 1 hour, and the T-die 2 having the die lip B (see Table 1) was used. Table 2 shows the evaluation results for the resulting optical film 9.

Example 5

An optical film 10 was obtained in the same manner as in Example 1, except that the T-die 2 having the die lip B (see Table 1) was used to increase the extrusion rate, the temperature of the cooling drums was changed to 95° C., and the take-up speed was changed to 0.41 m/s. Table 2 shows the evaluation results for the resulting optical film 10.

Example 6

An optical film 11 was obtained in the same manner as in Example 1, except that the T-die 2 having the die lip B (see Table 1) was used to increase the extrusion rate, the temperature of the cooling drums was changed to 85° C., and the take-up speed was changed to 0.48 m/s. Table 2 shows the evaluation results for the resulting optical film 11.

Example 7

An optical film 12 was obtained in the same manner as in Example 1, except that the pellets of the hydrogenated block copolymer [2]-1 were heated at 100° C. for 2.5 hours, and the T-die 2 having the die lip B (see Table 1) was used. Table 2 shows the evaluation results for the resulting optical film 12.

Example 8

An optical film 13 was obtained in the same manner as in Example 1, except that the pellets of the hydrogenated block copolymer [2]-1 were heated at 55° C. for 2.5 hours, and the T-die 2 having the die lip B (see Table 1) was used. Table 2 shows the evaluation results for the resulting optical film 13.

The optical films obtained in the examples were characterized in that the height from the peak of a ridge of a die line to the bottom point of a valley that is contiguous to the ridge was 100 nm or less, and the slope of the die line was 300 nm/mm or less. When the optical films obtained in the examples were stretched, and placed between polarizers, and leakage of light was measured, leakage of light did not occur when the backlight having an illuminance of 5,000 lx and the backlight having an illuminance of 10,000 lx were used (Examples 1 to 8).

The optical films obtained in the comparative examples were characterized in that the height from the peak of a ridge of a die line to the bottom point of a valley that is contiguous to the ridge was more than 100 nm, and/or the slope of the die line was more than 300 nm/mm. When the optical films obtained in the comparative examples were stretched, and placed between polarizers, and leakage of light was measured, leakage of light occurred when the backlight having an illuminance of 5,000 lx and the backlight having an illuminance of 10,000 lx were used (Comparative Examples

TABLE 1

| | Die | | | |
|---|---|---|---|---|
| | 1 | 2 | 3 | 4 |
| Die lip | A | B | C | D |
| Die lip material | Tungsten carbide | Tungsten carbide | Tungsten carbide | Tungsten carbide |
| Surface roughness Ra (representative value) | 0.005 μm | 0.03 μm | 0.05 μm | 0.1 μm |
| Ra distribution | ±0.001 | ±0.01 | ±0.04 | ±0.02 |

TABLE 2

| | | Hydrogenated block copolymer | Pellet treatment conditions | | | Film | | Die line | | Leakage of light | |
|---|---|---|---|---|---|---|---|---|---|---|---|
| | | | Temperature (° C.) | Time (h) | Die | Reference thickness (μm) | Thickness non-uniformity (%) | Height (nm) | Slope (nm/mm) | 5,000 lx | 10,000 lx |
| Example | 1 | [2]-1 | 85 | 4 | 1 | 50 | 1.5 | 36 | 50 | Did not occur | Did not occur |
| | 2 | [2]-1 | 85 | 4 | 2 | 100 | 2.7 | 28 | 180 | Did not occur | Did not occur |
| | 3 | [2]-2 | 80 | 5 | 2 | 100 | 2.1 | 21 | 175 | Did not occur | Did not occur |
| | 4 | [2]-2 | 60 | 5 | 2 | 100 | 2.1 | 68 | 198 | Did not occur | Did not occur |
| | 5 | [2]-1 | 85 | 4 | 2 | 100 | 2.7 | 72 | 230 | Did not occur | Did not occur |
| | 6 | [2]-1 | 85 | 4 | 2 | 100 | 2.7 | 92 | 270 | Did not occur | Did not occur |
| | 7 | [2]-1 | 100 | 2.5 | 2 | 100 | 2.6 | 41 | 183 | Did not occur | Did not occur |
| | 8 | [2]-1 | 55 | 2.5 | 2 | 100 | 2.8 | 100 | 210 | Did not occur | Did not occur |
| Comparative Example | 1 | [2]-1 | 85 | 4 | 3 | 100 | 3.5 | 120 | 77 | Did not occur | Occurred |
| | 2 | [2]-1 | 85 | 4 | 4 | 50 | 3.0 | 27 | 305 | Did not occur | Occurred |
| | 3 | [2]-1 | — | | 2 | 100 | 2.8 | 322 | 220 | Occurred | Occurred |
| | 4 | [2]-1 | 40 | 4 | 2 | 100 | 2.6 | 287 | 210 | Occurred | Occurred |
| | 5 | [2]-1 | 85 | 1 | 2 | 100 | 2.7 | 155 | 170 | Did not occur | Occurred |

The following were confirmed from the results obtained in the examples and the comparative examples.

3 and 4), or leakage of light did not occurred when the backlight having an illuminance of 5,000 lx was used, but leakage of light occurred when the backlight having an illuminance of 10,000 lx was used (Comparative Examples 1, 2, and 5).

When the average value of the surface roughness Ra of the die lip or the distribution range of the surface roughness Ra over the entire width of the die lip was outside the scope of the invention (Comparative Examples 1 and 2), the height of the die line and the slope of the die line were outside the scope of the invention.

When the heating conditions for the pellets of the hydrogenated block copolymer [2] before melt extrusion were outside the scope of the invention (Comparative Examples 3 to 5), the height of the die line was outside the scope of the invention, and leakage of light occurred when the backlight having an illuminance of 5,000 lx and the backlight having an illuminance of 10,000 lx were used.

INDUSTRIAL APPLICABILITY

An optical film that is formed of the hydrogenated block copolymer according to the embodiments of the invention has a reduced number of surface defects and has an excellent surface state. Therefore, the optical film is useful as a polarizer protective film, a retardation film, and the like.

REFERENCE SIGNS LIST

1: Baseline
2: Peak of ridge
3: Bottom point of valley
4: Distance from peak of ridge to bottom point of valley
5, 6: Line
7: Height from peak of ridge to bottom point of valley

The invention claimed is:

1. A method for producing an optical film comprising:
melting a hydrogenated block copolymer [2] using an extruder,
extruding the melted hydrogenated block copolymer [2] in a shape of a sheet from a die provided to the extruder,
forming the extruded sheet-shaped hydrogenated block copolymer [2] by bringing the extruded sheet-shaped hydrogenated block copolymer [2] into contact with at least one cooling drum, and
taking up the formed hydrogenated block copolymer [2],
wherein the hydrogenated block copolymer [2] is obtained by hydrogenating 90% or more of unsaturated bonds of a block copolymer [1] that comprises at least two polymer blocks [A] and at least one polymer block [B], the polymer block [A] comprising a repeating unit derived from an aromatic vinyl compound as a main component, the polymer block [B] comprising a repeating unit derived from a linear conjugated diene compound as a main component, a ratio (wA:wB) of a weight fraction wA of the polymer block [A] in the block copolymer [1] to a weight fraction wB of the polymer block [B] in the block copolymer [1] being 40:60 to 80:20,
wherein the die includes a die lip having an average value of surface roughness Ra of 0.05 µm or less, and a distribution range of the surface roughness Ra over a width of the die lip of ±0.025 µm or less with respect to the average value, and
wherein pellets of the hydrogenated block copolymer [2] that have been held at 50 to 120° C. for 2 hours or more are used as the hydrogenated block copolymer [2] in the melting step.

2. The method for producing an optical film according to claim 1,
wherein a height from a peak of a ridge of a die line that is formed in a longitudinal direction of the optical film to a bottom point of a valley that is contiguous to the ridge is 100 nm or less over an entire surface of the optical film, and
a slope of the die line that is calculated by an expression (1) is 300 nm/mm or less over the entire surface of the optical film, Slope (nm/mm)=(height from peak of ridge to bottom point of valley that is contiguous to ridge)/ (width from peak of ridge to bottom point of valley that is contiguous to ridge)   (1).

3. A method for producing a polarizer, comprising:
stacking the optical film obtained by the method for producing the optical film according to claim 1 on the polarizer as a polarizer protective film.

4. A method for producing a retardation film comprising stretching the optical film obtained by the method for producing an optical film according to claim 1.

* * * * *